United States Patent [19]

Voinov

[11] 4,069,372
[45] Jan. 17, 1978

[54] ELECTRIC ACCUMULATOR WITH A SOLID ELECTROLYTE

[75] Inventor: Michel Voinov, Geneva, Switzerland

[73] Assignee: Battelle Development Corporation, Columbus, Ohio

[21] Appl. No.: 746,108

[22] Filed: Nov. 30, 1976

[51] Int. Cl.$^2$ ............................................. H01M 6/30
[52] U.S. Cl. .................................... 429/104; 429/105; 429/193; 429/198; 429/199; 429/221; 429/223
[58] Field of Search ................................ 429/101-105, 429/221, 223, 193, 198, 199

[56] References Cited

U.S. PATENT DOCUMENTS

| | | | |
|---|---|---|---|
| 3,174,880 | 3/1965 | Buitkus | 429/105 X |
| 3,826,685 | 7/1974 | Dubin et al. | 429/105 |
| 3,870,561 | 3/1975 | Charbonnier | 429/102 |
| 3,877,984 | 4/1975 | Werth | 429/103 |
| 3,935,025 | 1/1976 | Codman et al. | 429/101 |

Primary Examiner—Charles F. LeFevour
Attorney, Agent, or Firm—Thomas W. Winland

[57] ABSTRACT

Electric accumulators of the type comprising an anode compartment containing an anode formed from at least one metal selected from the group consisting of metals belonging to Groups Ia, IIa, IIb and IIIb of the periodic table of elements; a cathode compartment containing a cathode formed at least partly from a conducting member comprising a substance capable of accepting electrons, to form anions by cathodic reduction, and an electrolyte consisting of a substance capable of dissolving the product or products generated during discharge of the accumulator; the anode compartment and cathode compartment being separated from each other by a wall impervious to fluids and formed from a solid mineral electrolyte capable of allowing selective migration of the anode metal, in the form of cations are improved by adding to the anode compartment a salt of the anode metal between the anode and the separation wall.

16 Claims, 1 Drawing Figure

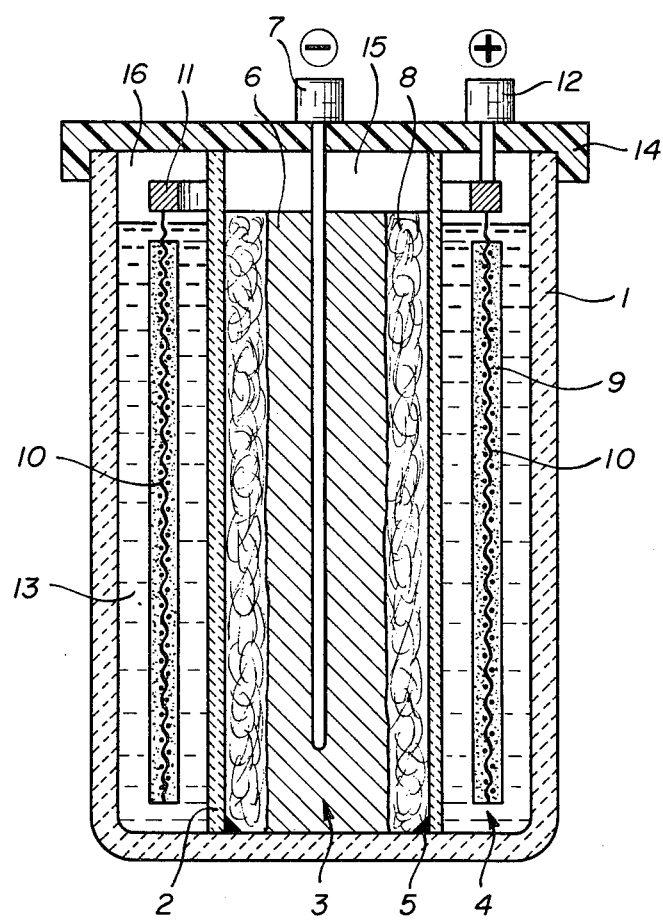

ELECTRIC ACCUMULATOR WITH A SOLID ELECTROLYTE

This invention relates to an electric accumulator comprising an anode compartment containing a metal anode consisting of at least one metal chosen from the metals belonging to groups Ia, IIa, IIb and IIIb of the periodic table of elements, a cathode compartment containing a cathode at least partly consisting of a conducting member comprising a substance capable of accepting electrons, to form anions by cathodic reduction, and an electrolyte consisting of a substance capable of dissolving the product or products generated during discharge of the accumulator, the anode compartment and cathode compartment being separated from each other by a wall impervious to fluids and formed from a solid mineral electrolyte capable of allowing selective migration of the anode metal, in the form of cations.

BACKGROUND OF THE INVENTION

Electric accumulators are already known comprising an anode compartment containing a metal anode and a cathode compartment containing an electron acceptor substance, these compartments being separated from each other by a wall impervious to fluids and formed from a solid mineral electrolyte capable of allowing selective migration of the anode metal in the form of cations, when a potential difference is created between the anode and cathode.

French Pat. No. 1490198 describes an electric accumulator comprising an anode formed from an alkaline metal, preferably sodium, potassium or lithium, and an electron acceptor substance contained in the cathode compartment, and consisting of an alkaline polysulphide, preferably sodium polysulphide with a composition variable from $Na_2S_5$ to $Na_2S_3$ according to the state of charge of the accumulator. The solid electrolyte used in this accumulator for allowing migration of the cations of the alkaline metal is sodium beta aluminate, the approximate composition of which may be expressed by the formula $Na_2O. 11\ Al_2O_3$, or analogous compounds derived from sodium beta aluminate by at least partially replacing the sodium by another alkaline metal and/or by adding a mineral compound such as boron oxide $B_2O_3$.

French Pat. No. 1491674 describes an electric accumulator of the same type as that which forms the object of the French Pat. No. 1490198, but in which the solid electrolyte used is not only beta aluminate but also a glass which conducts the cations of the alkaline metal of the anode, this glass being obtained either from a ternary mixture of sodium oxide $Na_2O$, aluminum oxide $Al_2O_3$ and silica $SiO_2$, or from a ternary mixture of sodium oxide, aluminium oxide and boron oxide $B_2O_3$.

Accumulators of the type described in the two said French Patents have the considerable advantage relative to traditional lead accumulators (in which the energy density is of the order of 23 Wh/kg) of providing an energy density greater 100 Wh/kg.

However these accumulators suffer from the disadvantage of not being able to operate at a temperature lower than about 300° C because of the need to maintain the electron acceptor substance (alkaline polysulphide or an alkaline polysulphide mixture) in the liquid state, its melting point, which depends on the state of change of the accumulator, usually varying between 265° and 350° C. Moreover, the high corrosivity of the alkaline polysulphides used in these accumulators causes rapid deterioration of the constituent parts thereof, which means that such accumulators have an insufficient life to enable them to be used industrially.

The fact that the wall separating the anode compartment from the cathode compartment is directly in contact with the alkaline metal of the anode is also prejudicial to the proper operation of such an accumulator, as this can cause short circuits and fractures in said wall.

Moreover, sulphur may be produced in an elementary and therefore electrically insulating and electrically uncharged form when the accumulator is charged or discharged rapidly, this likewise unfavourably influencing the operation of the accumulator.

The U.S. Pat. No. 3,877,984 describes an electric accumulator similar to those forming the object of the two aforesaid French Patents, and comprising, as in the case of these latter, an anode formed from an alkaline metal, and a solid electrolyte which allows selective migration of this metal in the form of cations, the electrolyte being in the form of an impermeable separable wall between the anode compartment and cathode compartment.

The electron acceptor substance contained in the cathode compartment of this accumulator is a metal chloride such as antimony chloride, cuprous chloride, ferric chloride or nickel chloride. When the accumulator is in its state of maximum charge, this chloride is at least partly dissolved in an electrolyte, which is liquid at the operating temperature of the accumulator, and consisting of an alkaline chloroaluminate corresponding to the anode metal, for example sodium chloro-aluminate $NaAlCl_4$.

The operating temperature range for this accumulator lies between about 180° and 200° C, these limits being lower than those of the accumulator described in French Pat. Nos. 1490198 and 1491674 because of the use of said alkaline chloro-aluminate, the melting point of which lies between 125° and 200° C, as the liquid electrolyte in the cathode compartment.

Swiss Pat. No. 517385, with which in particular the U.S. Pat. No. 3,370,771 and the Federal German Republic Pat. No. 2051395 correspond, describes an electric accumulator comprising an anode compartment containing a metal anode formed from a metal chosen from the alkaline and alkaline earth metals, and a cathode compartment containing an electron acceptor cathode in the form of a solid member comprising an electron acceptor substance consisting preferably of a metal salt, and in particular of a transition metal halide, said cathode compartment also containing a solution of at least one salt of the anode metal in a polar organic solvent such as dimethylformamide, N,N'-dimethylacetamide, gamma-butyrolacetone, tetrahydrofuran or propylene carbonate, the anode compartment being separated from the cathode compartment by an impervious wall of a solid electrolyte which allows the selective migration of the cations of the anode metal.

In one particular embodiment of this accumulator, the anode compartment contains a solution of at least one salt of the anode metal in a polar organic solvent, identical or similar to the solution contained in the cathode compartment, this solution being interposed between the anode and the separation wall.

This accumulator has the advantage of being able to operate over a temperature range which includes ambient temperature.

However, although such an accumulator may have a high energy density, for example of the order of 250 Wh/kg, its power density is limited because of the relatively low electrical conductivity of the organic solutions which can be used in the cathode compartment (and also in the anode compartment if the case arises).

Consequently, this accumulator appears particularly suitable for use in fields in which a high power density is not necessary, but not suitable for use in fields which on the contrary require high power densitites, such as for supplying electric traction motors for motor vehicles.

DETAILED DESCRIPTION OF THE INVENTION

The object of the invention is to supply an electric accumulator which simultaneously provides a high energy density and a high power density, with an operating temperature range from ambient temperature (i.e. about 15° to 25° C) to an upper limit of the order of 200° C or more.

To this end, the electric accumulator according to the invention is characterised in that the anode compartment contains at least one salt of the anode metal capable of allowing migration of this metal in the form of cations, said salt being interposed between the anode and said separation wall.

Preferably said salt of the anode metal has a melting point not exceeding 200° C.

The anode metal used is preferably an alkaline metal, in particular sodium, potassium, lithium or rubidium.

An alkaline earth metal, in particular calcium, strontium or barium, or a metal belonging to the rare earth group, in particular lanthanum, may be equally used with advantage.

It may be advantageous to use the anode metal in the form of an alloy of this metal with at least one other metal chosen from the metals belonging to groups Ia, IIa, IIb and IIIb of the periodic table of elements.

In particular, such an alloy could be an alloy having a low melting point, preferably less than 100° C. such as a sodium-potassium alloy containing at least 40% and at most 90% by weight of potassium. This latter alloy is in the form of a homogeneous liquid phase at ambient temperature.

An alloy relatively little sensitive to oxidation and/or to the action of humidity may also be used with advantage.

An alloy may also be used which is both liquid at ambient temperature and little sensitive to oxidation and/or to the action of humidity, such as a sodium amalgam (sodium-mercury alloy).

The substance capable of accepting electrons to form anions by cathodic reduction is preferably an easily reducible salt of a transition metal, in particular a halide, an oxide or a sulphide of a metal chosen from iron, nickel, cobalt, chromium, copper or vanadium. A mercury or silver salt may equally be used. More particularly, ferrous chloride $FeCl_2$ is preferably used.

Where the substance capable of accepting electrons is not sufficiently conducting by itself, the cathode may be made electrically conducting by using, mixed with the former substance, an auxiliary conducting substance such as graphite. The auxiliary conducting substance used may equally be the metal corresponding to the electron acceptor substance where this latter is a metal salt.

The anode metal salt interposed in the anode compartment between the anode and separation wall is preferably a salt or a mixture of salts chosen from the group of compounds of one of the two general formulas:

$Me(B R_4)_n$ and $Me(Al R_4)_n$ in which Me represents a metal belonging to groups Ia, IIa, IIb or IIIb of the periodic table, and preferably an alkaline metal, R represents an alkyl or aryl group and $n$ is equal to 1, 2 or 3 according to the valency of the metal Me.

For example, at least one of the following salts may be used:

$Na Al(CH_3)_4$; $Na Al(C_2H_5)_4$; $Na Al(n\text{-propyl})_4$;
$Na Al(n\text{-butyl})_4$; $Na Al(\text{isobutyl})_4$; $K Al(C_2H_5)_4$;
$Na B(C_2H_5)_4$; $K B(C_2H_5)_4$.

The mixture of salts used may for example be a mixture containing 80 mole % of $KAl(C_2H_5)_4$ and 20 mole % of $Na Al(C_2H_5)_4$ (a mixture with a melting point of 74° C), a mixture containing 50% by weight of $Na B(C_2H_5)_4$ and 50% by weight of $K B(C_2H_5)_4$, or a mixture of $Na Al(C_2H_5)_4$ and $Na Al(CH_3)_4$.

A salt or a mixture of salts of one of the following formulas may likewise be used:

$Me(B R_3 H)_n$ or $Me(Al R_3 H)_n$ in which Me, R and $n$ have the same meaning as heretofore, and in particular the salt of formula $Na B(C_2H_5)_3H$, which has a melting point less than ambient temperature. These latter salts may be used in mixture with at least one of the aforementioned salts (Me B $R_4$ and Me Al $R_4$).

The electrolyte in the form of a substance capable of dissolving the products generated during accumulator discharge may be a salt or a mixture of salts identical or analogous with that used in the anode compartment, or a metal halogenaluminate of formula $Me Al X_4$ in which Me has the meaning indicated heretofore and X is a halogen. This salt or mixture of salts is preferably chosen from those with a melting point less than 200° C.

The metal halogen-aluminate of formula Me Al $X_4$ is preferably sodium chloro-aluminate $Na Al Cl_4$.

A mixture of salts of low melting point may also advantageously be used, in particular the eutectic mixture $NaCl\text{-}AlCl_3$, containing 40 mole % of NaCl and 60 mole % of $AlCl_3$ and of melting point 115° C.

The solid mineral electrolyte capable of allowing selective migration of the anode metal in the form of cations is preferably a crystalline substance of the so-called "beta aluminate" type, and in particular sodium beta aluminate, the approximate composition of which corresponds to a formula between $Na_2O . 7 Al_2O_3$ and $Na_2O . 11 Al_2O_3$.

Substances of this type are well known. Their compositions and structures are related to those of sodium beta aluminate.

For example, a beta alumina may be used having one of the following approximate formulas:

$K_2O . 7$ to $11 Al_2O_3$; $Rb_2O . 7$ to $11 Al_2O_3$;
$Cs_2O . 7$ to $11 Al_2O_3$; $Li_2O . 7$ to $11 Al_2O_3$; $Ca O . 6 Al_2O_3$
and $La_2O_3 . 7$ to $11 Al_2O_3$.

Substances of this type may for example be obtained either directly, or from sodium beta aluminate by at least partially replacing the sodium in the crystalline lattice with at least one other metal.

The solid mineral electrolyte may also be any suitable crystalline or amorphous substance capable of allowing selective migration of the anode metal cations, which has a sufficiently low specific electrical resistance at the accumulator operating temperature to enable a very high current density per unit of separation wall area to be obtained.

For example, glasses which conduct sodium ions may be used, such as those described in the U.S. Pat. No. 2,929,909 ($Na_2O$, $Al_2O_3$ and $SiO_2$-based glasses) and those described in French Pat. No. 1491674 (glasses based on 47 to 58 mole % of $Na_2O$; 20 to 30 mole % of $Al_2O_3$ and 20 to 30 mole % of $B_2O_3$, or glasses based on 47 to 58 mole % of $Na_2O$; 3 to 12 mole % of $Al_2O_3$ and 34 to 50 mole % of $SiO_2$).

In the accompanying drawing, the single FIGURE is a vertical diagrammatic section through one embodiment of the electric accumulator according to the present invention, given by way of non-limiting example.

The accumulator shown in the single figure of the drawing comprises a tubular container 1 which is electrically insulating but a relatively good conductor of heat, such as a calcined alumina tube for example of cylindrical cross-section, closed at its lower end.

A tube 2 which may also be of cylindrical cross-section, and which has a thin but impermeable wall of solid mineral electrolyte allowing the selective migration, in the form of cations, of a metal belonging to Groups I$a$, II$a$, II$b$ or III$b$ of the periodic table of elements, is disposed coaxially to the interior of the tube 1, so as to divide the space in the tube 1 into a cylindrical compartment 3 and an annular compartment 4.

The tube 2 is fixed tightly on the base of the tube 1 by a suitable joint 5, made from a material of good resistance to chemical attack by the salt of the metal anode contained in the anode compartment, for example of fibre glass impregnated with polyethylene or polypropylene.

The compartment 3, which forms the anode compartment of the accumulator is nearly completely filled with a central mass 6 consisting of at least one metal belonging to groups I$a$, II$a$, II$b$ or III$b$ of the periodic table of elements, and into which penetrates a collecting rod 7 for anode current, e.g. a nickel rod, the upper free end of which forms the negative terminal of the accumulator.

As a modification, it may be advantageous to provide the anode compartment with an anode metal reservoir, which may either form an integral part of the compartment or be made in the form of an auxiliary compartment, so as to keep constant the active surface of the solid electrolyte separation wall allowing migration of the alkaline metal ions, whatever the state of charge of the accumulator.

It may also be an advantage to provide a space in the cathode compartment to allow possible expansion of the cathode liquid without any change in the active surface of the separation wall.

It may also be useful to provide the accumulator with means to allow the pressure in the anode and cathode compartments to be equalised.

In a further modification, to facilitate drainage of the electric current, the anode metal may be contained in a porous mass of an inert material which is a good electrical conductor, such as nickel, e.g. a sponge or calcined mass of nickel, connected electrically to the negative terminal of the accumulator. The rod 7 may also be simply replaced by a suitable conducting grid, for example a nickel grid.

Between the anode metal mass 6 and tube 7 there is interposed an annular layer 8 of a porous inert fibrous or granular material, for example a fibre glass felt or paper impregnated with a salt of the anode metal which preferably has a melting point not exceeding 200° C and allows migration of this metal in the form of cations.

Preferably the anode metal 6 is sodium, and the tube 2 is of sodium beta aluminate, the anode metal salt being sodium tetraethylaluminate Na Al($C_2H_5$)$_4$.

The compartment 4, which forms the cathode compartment of the accumulator, is provided with an annular cathode 9 consisting of a solid member which conducts electricity and preferably or porous structure comprising a substance able to accept electrons to form anions by cathodic reduction, such as ferrous chloride $FeCl_2$.

A grid 10 of a material which is a good conductor of electricity such as iron, is enclosed in the cathode 9 and serves as a cathode current collector. The grid 10 is connected electrically to an electric conductor ring 11, which may also be of iron, and which is connected to a conducting rod 12, the upper free end of which forms the positive terminal of the accumulator.

The compartment 4 also contains an electrolyte bath 13 which is a liquid at the accumulator operating temperature, and which consists for example of the eutectic mixture of sodium chloride and aluminium chloride containing 40 mole % of NaCl and 60 mole % of $AlCl_3$, the melting point of which is 115° C.

The upper ends of the compartments 3 and 4 are hermetically sealed by a tight cover 14, for example a bakelite cover, and the free spaces in these compartments, 15 and 16 respectively, above the anode metal mass 6 and separation layer 8 (anode compartment) and above the liquid electrolyte bath 13 (cathode compartment) are filled with an inert gas atmosphere consisting for example of dry argon.

The accumulator described operates in the following manner:

During accumulator discharge, the anode metal is ionised at the surface of contact between the metal mass 6 and the molten salt bath of said metal contained in the layer 8, so liberating electrons which are drained towards the external circuit by the conducting rod 7.

For example where the anode metal is sodium, the formation of each sodium Na$^+$ ion is accompanied by the liberation of one electron into the external circuit.

The anode metal ions so formed are transported in the ionic state through the liquid molten salt bath contained in the layer 8, and then through the solid wall of the tube 2 in the direction of the liquid electrolyte bath 13 contained in the cathode compartment 4.

The operation of the accumulator therefore requires that the mass of anode metal salt contained in the layer 8 inside the anode compartment 3, and the mass of electrolyte 13 contained in the cathode compartment 4 are simultaneously in the liquid state.

The minimum operating temperature of the accumulator is therefore necessarily greater than the higher of the melting points of these two masses.

For example, where the salt of the anode metal contained in the anode compartment 3 is sodium tetraethylaluminate, the melting point of which is of the order of 125° to 130° C, and the electrolyte 13 is the eutectic mixture of sodium chloride and aluminium chloride, the melting point of which is 115° C, the minimum operating temperature of the accumulator is of the order of 130° C.

It should be noted that the accumulator according to the invention can operate just as well at a temperature at which the anode metal is in the liquid state, as at a temperature lower than the melting point of this metal.

By suitably choosing the salt of the anode metal contained in the anode compartment and by suitably choosing the electrolyte 13, an accumulator according to the invention may be constructed having an operating temperature slightly greater or equal to ambient temperature.

At the cathode 9, the substance capable of accepting electrons, for example ferrous chloride $FeCl_2$, is reduced by forming anions, for example the anions $Cl^-$. Where this substance is a reducible metal compound, it may either form a corresponding metal compound of lower valency (the case of $FeCl_3$ reduced to $FeCl_2$) or the corresponding metal (the case of $FeCl_2$ reduced to metallic iron).

The cathode reaction during discharge is therefore for example the following:

$$2e^- + FeCl_2 \rightarrow Fe + 2Cl^-$$

The electrons necessary for this reaction are conveyed from the external circuit to the cathode 9 by way of the conducting rod 12, the ring 11 and the grid 10.

The number of chloride anions formed is equal to the number of $Na^+$ cations which pass into the electrolyte 13. The overall chemical reaction during discharge of the accumulator is therefore for example represented by the following equation:

$$2 Na + FeCl_2 \rightarrow 2 Na^+ + 2 Cl^- + Fe$$

which is the sum of the cathode reaction given heretofore and anode reaction $$2 Na \rightarrow 2 Na^+ + 2e^-.$$

Thus, as the accumulator progressively discharges, the anode metal (in this case sodium) becomes consumed, as does the reducible substance of the cathode (in this case ferrous chloride $FeCl_2$), while metallic iron is formed at the cathode and the electrolyte 13 becomes enriched with the reaction product (in this case sodium chloride) at least partially in the dissolved state.

The accumulator is recharged by the reverse operation, namely by passing an electric current through the accumulator by conveying electrons to the anode 6 by way of the conducting rod 7 and withdrawing electrons at the cathode 9 by way of the collecting grid 10, the conducting ring 11 and the conducting rod 12, after connecting a suitable electric generator (not shown on the drawing) to the accumulator terminals.

During accumulator charging, electro-chemical phenomena which are the reverse of those heretofore described are produced, so that at the cathode the reducible compound is formed by oxidation with liberation of electrons, e.g. in accordance with the equation:

$$Fe + 2 Cl^- \rightarrow FeCl_2 + 2e^-$$

and, simultaneously, electrolyte 13 impoverished of the discharge reaction product (e.g. NaCl) and the anode metal, e.g. metallic sodium, forms in the anode compartment 3 as a consequence of the discharge of ions of this metal which arrive from the cathode compartment 4 after migration through the wall of the tube 2 and the bath of anode metal salt contained in the layer 8.

It should be noted that it is not necessary initially for the accumulator to contain the anode metal in the metal state, as this metal may be formed during the first charging of the accumulator. This is an advantage, particularly when the anode metal is a very reactive metal such as sodium, because it greatly facilitates the manufacture and storage of the accumulator. This requires that the anode compartment be provided with a current collector which is initially in contact with the anode metal salt.

The accumulator elements according to the invention may, if required, be connected together in series or parallel to form a battery of suitable electromotive force and capacity.

Suitable heating and/or heat removal means and thermal insulation means may be combined in known manner with the accumulator elements according to the invention, so as to raise these latter to their operating temperature and maintain them thereat.

EXAMPLE

An accumulator element corresponding to the embodiment shown on the drawing and having the following characteristics:

Type of anode metal : sodium

Type of electron acceptor substance : $FeCl_2$

Type of anode metal salt interposed between the anode and separation wall in the anode compartment : Na Al $(C_2H_5)_4$ Type of solid electrolyte forming the separation wall : sodium beta alumina (wall thickness : 1.5 mm)

Type of substance contained in the cathode compartment, capable of dissolving the discharge reaction product (NaCl) : eutectic NaCl — $AlCl_3$ mixture (40 mole % NaCl + 60 mole % $AlCl_3$)

Operating temperature : 145° C can receive a charge of 4 Ah/cm$^2$ at a charging current density of 0.5 A/cm$^2$ (charging time : 8h) or a charge of 13.2 Ah/cm$^2$ applied at a charging current density of 0.066 A/cm$^2$ (charging time : 200 hours).

The open circuit voltage of this element is 2.85 volts and its power density reaches 100 mW/cm$^2$ (separation wall) for a voltage of 1.6 volts.

I claim:

1. In an electric accumulator comprising an anode compartment containing an anode formed from at least one metal selected from the group consisting of metals belonging to Groups Ia, IIa, IIb and IIIb of the periodic table of elements; a cathode compartment containing a cathode formed a conducting member comprising a substance capable of accepting electrons, to form anions by cathodic reduction, and an electrolyte consisting of a substance capable of dissolving the product or products generated during discharge of the accumulator, said electrolyte being maintained in a molten state; the anode compartment and cathode compartment being separated from each other by wall impervious to fluids and formed from a solid mineral electrolyte capable of allowing selective migration of the anode metal in the form of cations; the improvement consisting in that the anode compartment contains a porous matrix adjacent said anode and at least one salt of the anode metal capable of allowing migration of this metal in the form of cations, said salt being maintained in a molten state and permeating said porous matrix, with said salt and said matrix being interposed between the anode and said separation wall.

2. The accumulator of claim 1, wherein said anode metal salt has a melting point not exceeding about 200° C.

3. The accumulator of claim 1, wherein said anode metal salt is selected from the group consisting of compounds of the two general formulas:

$$Me(B\ R_4)_n \text{ and } Me(Al\ R_4)_n$$

( in which Me represents a metal selected from the group consisting of metals belonging to Groups Ia, IIa, IIb and IIIb of the periodic table of elements, R respresents an alkyl or aryl group and $n$ is 1, 2 or 3, according to the valency of the metal Me) and mixtures of at least two of these copounds.

4. The accumulator of claim 3, wherein said anode metal salt is sodium tetraethylaluminate Na Al$(C_2H_5)_4$.

5. The accumulator of claim 1, wherein said anode metal salt is chosen from the group consisting of compounds of the two general formulas:

$$Me(B\ R_3\ H)_n \text{ and } MeAl(R_3\ H)_n$$

(in which Me represents a metal selected from the group consisting of metals belonging to Groups Ia, IIa, IIb and IIIb of the periodic table of elements, R represents an alkyl or aryl group and $n$ is 1, 2 or 3 according to the valency of the metal Me) and mixtures of at least two of these compounds.

6. The accumulator of claim 5, wherein said anode metal salt is the compound of formula NaB$(C_2H_5)_3$ H.

7. The accumulator of claim 1, wherein said anode metal is sodium.

8. The accumulator of claim 1, wherein said solid mineral electrolyte capable of allowing selective migration of the anode metal in the form of cations is sodium beta aluminate.

9. The accumulator of claim 1, wherein said substance contained in the cathode compartment and capable of dissolving the products generated during accumulator discharge consists of at least one anode metal salt selected from the same group as the anode metal contained in the anode compartment.

10. The accumulator of claim 1, wherein said substance contained in the cathode compartment and capable of dissolving the products generated during accumulator discharge consists of a metal halogenoaluminate of formula Me Al $X_4$, wherein Me is a metal selected from the group consisting of metals belonging to Groups Ia, IIa, IIb and IIIb of the periodic table of elements.

11. The accumulator of claim 10, wherein the said substance is the eutectic mixture NaCl-AlCl$_3$.

12. The accumulator of claim 1, wherein said substance capable of accepting electrons to form anions by cathodic reduction is a transition metal salt.

13. The accumulator of claim 12, wherein said transition metal salt is selected from the group consisting of halides, oxides and sulphides.

14. The accumulator of claim 12, wherein said transition metal is selected from the group consisting of iron, nickel cobalt, chromium and vanadium.

15. The accumulator of claim 12, wherein said transition metal salt is ferrous chloride FeCl$_2$.

16. In an electric accumulator comprising an anode compartment containing an anode formed from at least one metal selected from the group consisting of metals belonging to Groups Ia, IIa, IIb and IIIb of the periodic table of elements; a cathode compartment containing a cathode formed at least partly from a transition metal, and an electrolyte which is maintained in a molten state; the anode compartment and cathode compartment being separated from each other by a wall impervious to fluids and formed from sodium beta aluminate; the improvement consisting in that the anode compartment contains a porous matrix adjacent said anode and at least one anode metal salt having a melting point not exceeding about 200° C and being selected from the group consisting of compounds of the general formulas:

Me(B R$_4$)$_n$, Me(Al R$_4$)$_n$, Me(B R$_3$ H)$_n$, Me(Al R$_3$ H)$_n$ and Me Al X$_4$ (in which Me represents a metal selected from the group consisting of metals belonging to Groups Ia, IIa, IIb and IIIb of the periodic table of elements, R represents an alkyl or aryl group and $n$ is 1, 2 or 3, according to the valency of the metal Me and X is a halogen atoms) and mixtures of at least two of these compounds, said salt being maintained in a molten state and permeating said porous matrix; the electrolyte being selected from the group consisting of the same group as the anode metal salt and the eutectic mixture NaCl-AlCl$_3$.

* * * * *